United States Patent
diGirolamo et al.

(10) Patent No.: US 7,559,512 B1
(45) Date of Patent: Jul. 14, 2009

(54) PIPE HANGER AND PIPE SUPPORT SYSTEM

(75) Inventors: Edward R. diGirolamo, Raleigh, NC (US); Michael L. Torres, Raleigh, NC (US); Milan Dragic, Wake Forest, NC (US)

(73) Assignee: The Steel Network, Inc., Raleigh, NC (US)

( * ) Notice: Subject to any disclaimer, the term of this patent is extended or adjusted under 35 U.S.C. 154(b) by 265 days.

(21) Appl. No.: 11/291,745

(22) Filed: Dec. 1, 2005

(51) Int. Cl.
*F16L 3/08* (2006.01)

(52) U.S. Cl. .................... 248/74.3; 248/74.4; 248/62; 24/23 R; 24/302

(58) Field of Classification Search ............... 248/60, 248/70, 74.1, 74.2, 74.3, 74.4; 24/20 R, 24/23 R, 23 W, 302
See application file for complete search history.

(56) References Cited

U.S. PATENT DOCUMENTS

| | | | |
|---|---|---|---|
| 2,974,916 A * | 3/1961 | Richey | 248/71 |
| 3,049,326 A * | 8/1962 | Otterson | 248/59 |
| 3,118,644 A * | 1/1964 | Wernig | 248/73 |
| 3,169,004 A * | 2/1965 | Rapata | 248/71 |
| 4,274,612 A * | 6/1981 | Massey | 248/74.3 |
| 6,202,962 B1 * | 3/2001 | Snyder | 248/60 |
| 6,581,885 B2 * | 6/2003 | Polad | 248/74.3 |

* cited by examiner

*Primary Examiner*—J. Allen Shriver
*Assistant Examiner*—Steven Marsh
(74) *Attorney, Agent, or Firm*—Coats & Bennett, P.L.L.C.

(57) ABSTRACT

A pipe and support system is provided including a pipe that extends adjacent a wood member. A metal pipe hanger is configured into a loop and includes opposite end portions that include spikes that project therefrom. The opposite end portions of the pipe hanger can be driven into the wood members so as to secure the opposite end portions of the pipe hanger to the wood member so as to form a loop. A pipe segment is projected through the loop such that the pipe segment is supported by the pipe hanger, which in turn is supported by the wood member.

8 Claims, 3 Drawing Sheets

US 7,559,512 B1

PIPE HANGER AND PIPE SUPPORT SYSTEM

FIELD OF THE INVENTION

The present invention relates to pipe hangers, and more particularly to pipe support systems.

BACKGROUND OF THE INVENTION

Residential and commercial buildings invariably include networks of piping ranging from plumbing pipes to electrical conduits. While piping in these buildings is sometimes supported by a floor or underlying support structure, many piping layouts require that the piping be suspended, for example, by securing the piping to adjacent support structures such as beams, floor joists, ceiling joists, rafters, etc. Typically this is accomplished by utilizing pipe hangers. Pipe hangers generally extend around a portion of the pipe and attach by some means to a support structure.

There are drawbacks and shortcomings to conventional pipe hangers. They are often difficult to use and so difficult to use that suspending pipes and pipe networks in a building can be time consuming and costly. In addition, many conventional pipe hangers are inflexible, that is they have to be used in a certain way and do not give the installer a great deal of latitude when it comes to installing pipes and networks of pipes in unusual situations. Furthermore, some pipe hangers lack sufficient strength to adequately support certain spans of piping. In other cases, conventional pipe hangers tend to deteriorate and rust under certain conditions. Finally, many types of pipe hangers are expensive to make and this translates into an expensive product.

Therefore, there has been and continues to be a need for a highly flexible and easy to use pipe hanger that can be manufactured in a cost effective manner.

SUMMARY OF THE INVENTION

The present invention relates to a pipe hanger made from a pliable and bendable metal strap that includes opposed end portions. Formed on opposed end portions are one or more spikes that enable the opposed end portions to be attached to a wood member for example, by simply driving the spikes into the wood member. Hence, in this case no separate fasteners are required to secure the pipe hanger to a support structure.

In one embodiment of the present invention, there are provided spikes on opposite end portions of a metal strap. Each set of spikes on each end portion are directed such that the spikes on one end portion point in an opposite direction relative to the spikes on the other end portion. This permits the metal strap to be quickly and efficiently secured to a wood member for example, and at the same time form a loop through which a pipe may be extended and supported.

The present invention also entails a method of manufacturing a metal strap pipe hanger. In this case, a metal strap is cut from a piece of metal stock and includes opposite end portions. The strap is elongated and relatively thin. Selected cuts are made on opposite end portions of the strap to form elements that assume a spiked shape. The spiked shape elements are engaged and pressed out of the plane of the metal strap such that the spikes are disposed at an angle to the plane of the metal strap when the metal strap assumes a flat configuration.

Other objects and advantages of the present invention will become apparent and obvious from a study of the following description and the accompanying drawings which are merely illustrative of such invention.

DESCRIPTION OF EXEMPLARY EMBODIMENTS

Figure 1:
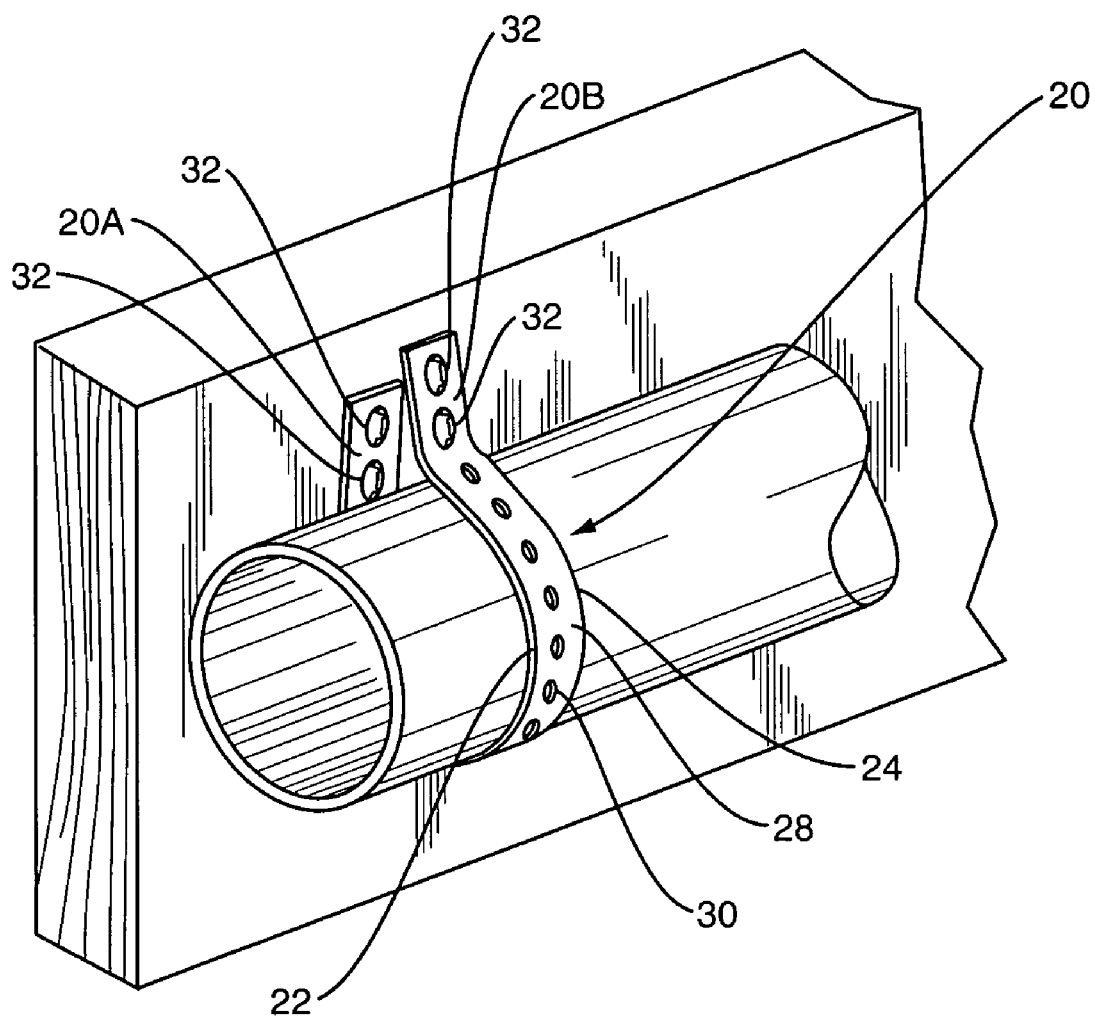
FIG. 1 is a perspective view of a pipe and pipe support system according to the present invention.

With further reference to the drawings, the pipe support system of the present invention is shown therein and indicated generally by the numeral 10. Pipe support system 10 comprises a support member 14, which in the case of this embodiment, is a wood member. Secured to the wood member 14 is a pipe hanger, indicated generally by the numeral 20. Pipe hanger 20 is connected to the support member 14 and forms a loop and a pipe or pipe segment 12 is projected into the loop. As seen in FIG. 1, pipe hanger 20 extends at least partially around the pipe 12 and supports the pipe. As will be appreciated from subsequent portions of this disclosure, opposite ends of the pipe hanger 12 include one or more spikes that are driven or projected into the support 14.

Pipe hanger 20 is in the form of a metal strap. It is pliable and bendable. As seen in the drawings the metal strap is elongated and is relatively thin compared to its width.

Continuing to refer to the metal strap or pipe hanger 20, the same includes a pair of opposed edges 22 and 24. Further, the metal strap 20 includes a first side 26 and a second side 28. For purposes of reference, reference 20A refers to one end portion of the metal strap 20, while 20B refers to a second end portion of the metal strap. A series of openings 30 are formed in the metal strap. Openings 30 extend from one end portion to another end portion of the strap.

With further reference to the embodiment of FIG. 1, the metal strap pipe hanger 20 includes terminal ends 20C and 20D. Formed just inwardly of each terminal end is a circular cutout indicated generally by the numeral 32. Circular cutout 32 includes a surrounding circular edge. Projecting from the circular edge is a series of triangular shaped spikes 34. These spikes project from the circular edge of the circular cutout 32 and extend in planes that lie generally normal to the plane of the metal strap when the metal strap assumes a flat and straight configuration such as depicted in FIG. 1. Note that the spikes 34 disposed on the right hand side of the strap 20 projects downwardly as viewed in FIG. 1. Expressed in another way, the spikes 34 on the right hand side of the strap 20 shown in FIG. 1 projects from the underside 28 of the metal strap. About the opposite end portion of the metal strap 20, the spikes 34 project in an opposite direction. That is, the spikes 34 project upwardly and from side 26 of the strap 20. Projecting the spikes in opposite directions, permits the strap or hanger 20 to be secured as shown in FIG. 1. That is, one side at one end portion is attached flush against the support 14 while the opposite side at the other end portion is attached flush against the support 14.

Figure 2:
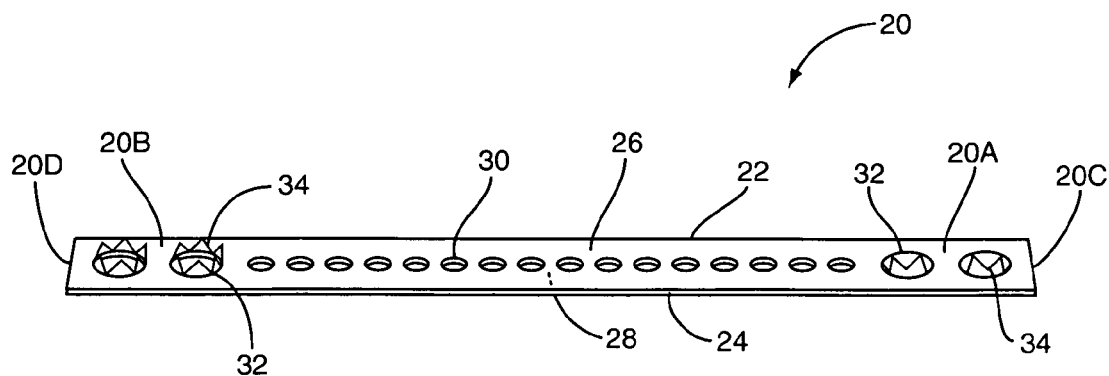
FIG. 2 is a perspective view of one embodiment of the metal strap pipe hanger of the present invention.
Figure 2A:
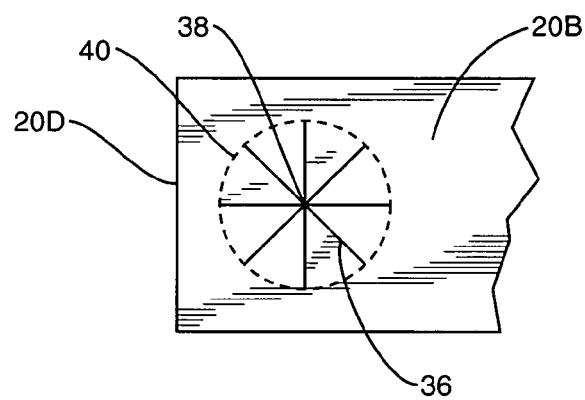
FIG. 2A is a fragmentary plan view of an end section of the metal strap pipe hanger of FIG. 2.
Figure 2B:
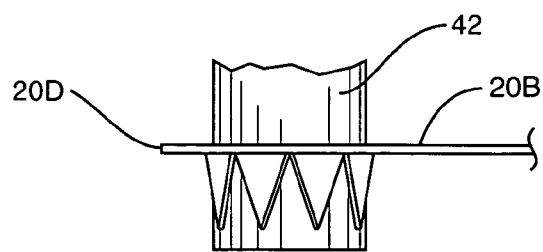
FIG. 2B is a fragmentary side elevational view showing a press inserted through an opening formed about an end portion of the metal strap.

To manufacture or fabricate the metal strap of FIG. 1, a circle area indicated by the numeral 40 is identified about a portion of the strap. This is illustrated in FIG. 2A. Then a number of cross cuts 36 are cut within the identified circle 40. Note that the individual cross cuts 36 all extend through a common point 38. This essentially cuts the identified circle 40 into pie shaped segments. Next, a press 42 (see FIG. 2B) is utilized to engage the pie shaped segments shown in FIG. 2A. By moving the press 42 through the opening identified by the circle area 40, press 42 presses the individual pie shaped element out of the plane of the strap to the position shown in FIGS. 1 and 2B. Now the individual pie shaped element form the spikes 34.

Figure 3:
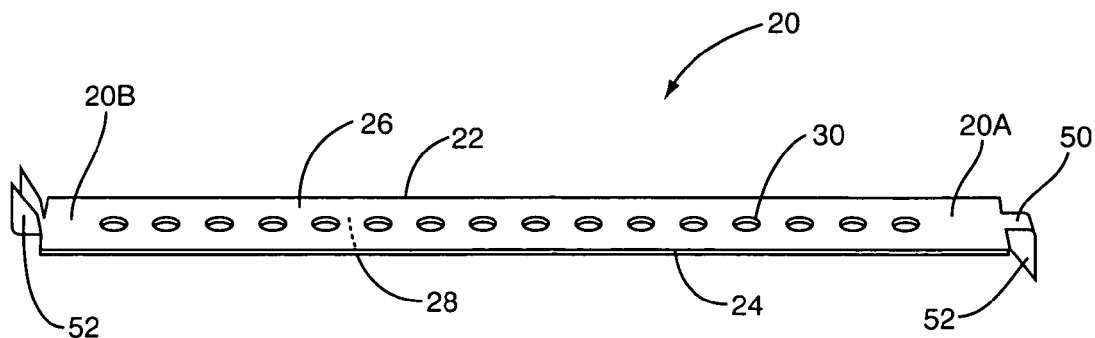
FIG. 3 is another embodiment of the metal strap pipe hanger of the present invention.

In the case of the FIG. 3 embodiment, at opposite ends of the strap there is provided two spikes 52 that are interconnected by a spike tab 50 which extends between the spikes 42 and which extends outwardly from the terminal end of the metal strap. Note again that the direction of the spikes 52 are directed in opposite directions about opposite ends of the strap 20.

Figure 3A:
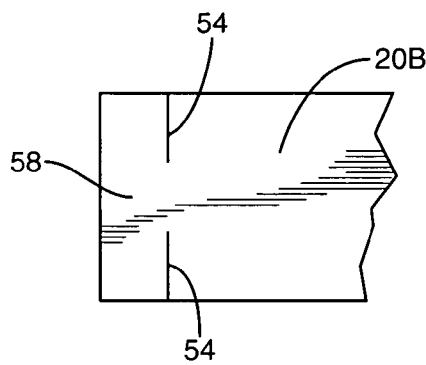
FIGS. 3A-3C are a sequence of views illustrating how the spikes of the metal strap shown in FIG. 3 are formed.

To manufacture or fabricate the design shown in FIG. 3, reference is made to FIG. 3A. The first step is to make two partial cuts 54 close to the terminal end of the strap. This forms a segment 58 that remains attached to the main portion of the strap 20. The partial cuts 54 separate end segment 58 from the main body of the hanger 20B.

Figure 3B:
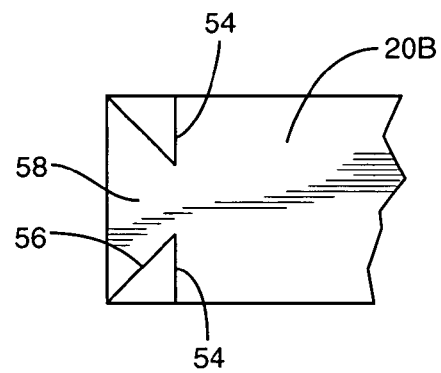
Figure 3C:
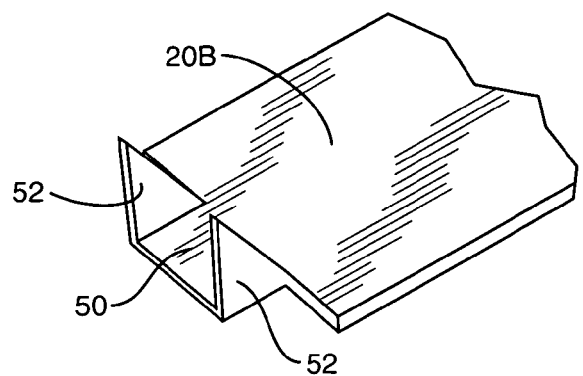

Next, as illustrated in FIG. 3B, a pair of diagonal cuts 56 are made on the segment 58. This essentially removes a corner portion of the segment 58 and forms the spikes 52. Finally, as shown in FIG. 3C, spikes 52 are bent inwardly to where they project in planes that lie generally normal to the plane of the hanger 20 as illustrated in the flat configuration shown in FIG. 3.

From the foregoing specification and discussion, it is appreciated that the present invention presents a strong and flexible pipe hanger made from a metal strap. This metal strap pipe hanger has many advantages including the advantage that the strap itself can be attached to a supporting structure without the use of separate fasteners such as nails, screws, bolts, etc. Further, the pipe hanger design is relatively simple, easy to manufacture and cost effective.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

The invention claimed is:

1. A method of hanging and supporting a pipe segment comprising:
   a. utilizing an elongated pliable metal strap having a series of spikes projecting out of the plane of the metal strap from opposite end portions thereof;
   b. attaching one side of the metal strap at one end portion directly to a first location on a wood member by driving the spikes on the one end portion into the wood end member so that the metal strap at the one end portion is attached flush against the wood member;
   c. attaching a second side of the metal strap at the opposite end portion directly to a second location on the wood member by driving the spike on the opposite end portion into the wood member so that the metal strap at the opposite end portion is attached flush against the wood member;
   d. forming a loop by particularly attaching the opposite end portions of the strap to the wood member as set forth above; and
   e. projecting the pipe segment into the loop such that the strap engages and supports the pipe segment.

2. The method of claim 1 wherein each series of spikes about each end portion of the metal strap form a circular configuration and extend in side-by-side relationship around the circular configuration and where each of the spikes lay in a plane that is generally perpendicular to the plane of the metal strap where the metal strap assumes a flat configuration.

3. The method of claim 1 wherein the spikes disposed on one end portion of the metal strap project in a direction opposite from the direction of the spikes on the other end portion of the metal strap.

4. The method of claim 1 wherein there is provided at least two spikes extending from each terminal end of the metal strap and wherein the metal strap includes opposed edges and wherein the spikes are indented inwardly from the opposed edges of the strap and are spaced apart and connected by a spike tab that lies in the same general plane as the metal strap where the metal strap assumes a generally flat configuration.

5. The method of claim 4 wherein the spikes disposed on one end of the metal strap point in a direction opposite from the direction of the spikes on the other end of the metal strap.

6. The method of claim 1 wherein the elongated pliable metal strap includes a series of spaced apart and aligned openings that extend from one end portion to the opposite end portion of the metal strap.

7. The method of claim 6 wherein attaching one side of the metal strap to the first location on the wood member includes driving the series of spikes projecting from a circular edge of one or more openings into the wood member.

8. The method of claim 2 wherein the metal strap includes a series of generally uniformly spaced apart openings that lay between the spikes at each end portion.

* * * * *